June 18, 1968   A. FISCHBACH ET AL   3,389,020
METHOD OF PRODUCING DEPOLARIZER ELECTRODES
FOR THERMAL BATTERIES
Filed May 4, 1956
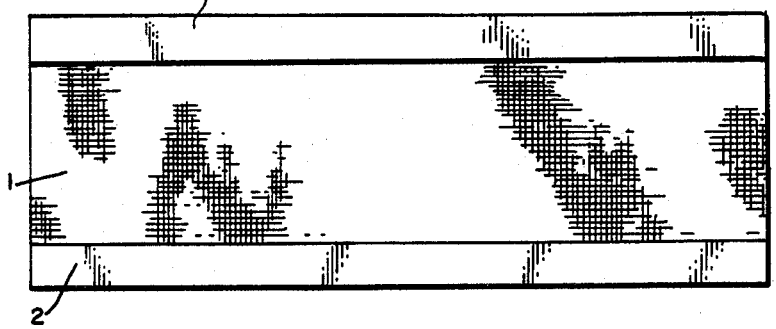
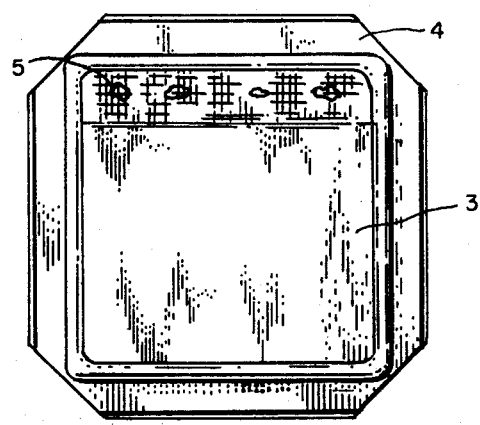
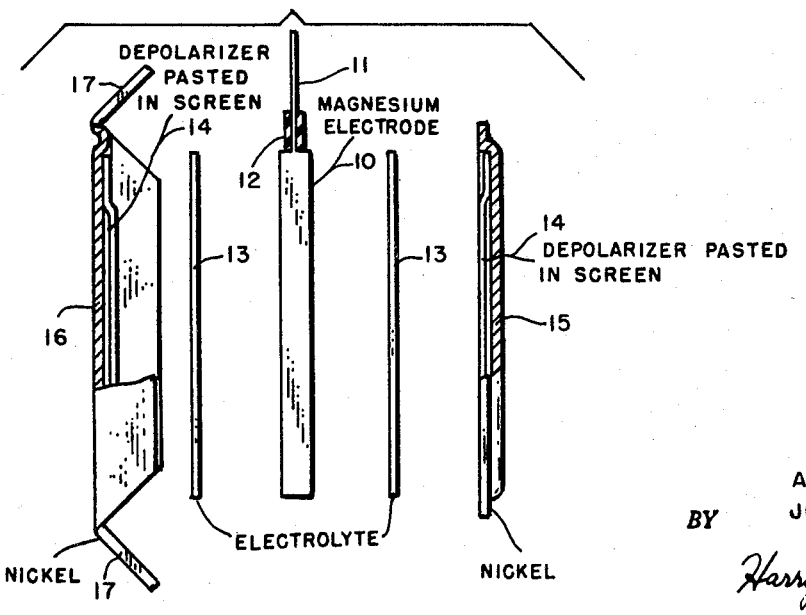
INVENTORS,
ADOLPH FISCHBACH
JOHN E. TETI
BY
Harry M. Saragovitz
ATTORNEY United States Patent Office 3,389,020
Patented June 18, 1968

3,389,020
METHOD OF PRODUCING DEPOLARIZER ELECTRODES FOR THERMAL BATTERIES
Adolph Fischbach, Elberon Park, and John E. Teti, West Long Branch, N.J., assignors to the United States of America as represented by the Secretary of the Army
Filed May 4, 1956, Ser. No. 583,603
3 Claims. (Cl. 136—120)

The invention described herein may be manufactured and used by or for the Government for governmental purposes without the payment of any royalty thereon.

This invention relates to a method of producing depolarizer electrodes for thermal batteries, that is, batteries made up from fused electrolyte cells.

Thermal batteries have been defined by R. B. Goodrich and Richard C. Evans (Jr. of Electrochem. Soc., vol. 9, August 1952) as electromechanical power supplies based upon electrolytes of various inorganic salts which remain solid and nonconductive at all storage temperatures. If these batteries are heated to some specified elevated temperature the electrolyte melts, becomes conductive and electrical energy may then be withdrawn from the system.

The negative electrodes of thermal cells consist usually of magnesium, calcium or certain alloys of lithium or other metals high in the electromotive series. The electrolytes of such cells are generally composed of alkali or alkaline earth chlorides, bromides and nitrates in various combinations. The depolarizer material usually consists of iron oxide, tungstic oxide, molybdenum trioxide, sodium or potassium zinc-chromate and similar insoluble oxidizing agents. The depolarizer electrode is usually made by applying these materials as a coating onto a metallic grid which may be made of silver, copper, nickel or iron.

Thermal batteries are used for special purpose applications, for instance, as power sources in guided missiles, because of their exceptional shelf stability, temperature range and ruggedness as well as their good weight and volume factors. For such special purpose applications a thermal battery may be built up of flat cells each cell being inclosed in a thin sheet metal casing made, for instance, of nickel. The required number of such fused-electrolyte cells is connected in series with insulating heating pads sandwiched in between the cells. At the desired moment the heating pads are fired by a priming, e.g., by an electric match and supply the heat necessary to raise the cell temperature above the melting point of the electrolyte which may be from as low as 150° C. to 600° C. and higher.

An insulating heating pad may be defined as a combination of electrical insulating material and a heat powder. After the heat powder has been burned the insulating material must remain in the form of a continuous dielectric layer between the cells, electrically insulating them from one another.

The heat powder is based in well known manner on a variety of exothermic chemical reactions while the insulating material may consist of ceramics, glass, asbestos, mica, etc.

The present method of making depolarizer electrodes for thermal batteries consists in welding a metal screen on each of the two inner surfaces of the metal casing which is to include the different parts of the cell. These metal screens constitute the grids for the depolarizer electrode and the depolarizing material, in the form of a wet slurry is pasted into these grids after they have been welded to the inner surfaces of the metal casing. There are many difficulties connected with this procedure which necessitates various manipulations as for instance the scraping of the excess depolarizer paste from the edges of the metal casing to which the grid has been welded.

The present invention is based on the discovery of unexpected advantages which are obtained in both the process and the product if the depolarizer material (in the form of a wet slurry) is applied to the metal screen before the screen is welded to the inner surface of the metal casing. The welding of the pasted screen is made possible by covering at least one edge of the screen with masking tape before pasting the depolarizer slurry into said screen. After a short drying period of the pasted screen the masking tape is removed from the edge and the unpasted edge can now be easily welded to the metal casing.

To facilitate mass-production the depolarizer slurry may be pasted into long strips of metal screens at least one edge of which is covered with a masking tape. After drying, these strips may be cut into electrodes of the desired dimensions.

The invention will be best understood from the following description of an illustrative embodiment in conjunction with the accompanying drawing, in which FIG. 1 shows a plan view of a long screen strip one edge of which is covered by a masking tape, FIG. 2 is a front elevation of a depolarizer electrode made according to the invention and welded to the inner surface of a nickel casing, and FIG. 3 is an exploded view of a side elevation of a thermal cell with depolarizer electrodes according to the invention.

Referring now to the drawing, FIG. 1 shows a metal screen 1, consisting of a nickel coated copper screen one or two edges of which are covered with a masking tape 2. In some cases it may be advantageous to cover both edges with a masking tape so that the depolarizer material is carried by a middle zone of the screen. The uncovered part of the metal screen 1 will be coated with a mixture of the depolarizer with sufficient water to make a paste. Sometimes it is advisable to add small amounts of a binder such as, for instance, sodium silicate or the like. The preferred depolarizer known in the art consists of a pasty mixture of iron oxide, sodium silicate and water. After the screen 1 is pasted it is dried preferably in an oven at 200° F. and the dried strip is then cut to electrodes of the desired size, the masking tape is removed and the finished electrode 3 may then be spot-welded as shown in FIG. 2 to the inside of a nickel casing 4. As indicated by the welding spots 5 only the unpasted portion of the electrode 3 is welded to the nickel casing 4.

The structure of a cell made with depolarizer electrodes according to the invention is shown in FIG. 3. The cell consists of a negative magnesium electrode 10 having a terminal 11. The part of the terminal 11, that leads out of the nickel casing 4 is covered with insulation 12. On both sides of the magnesium electrode 10 there are provided solid electrolyte layers 13 which remain solid and nonconductive at room temperature. The depolarizer electrodes 14, 14 are spot-welded to the nickel casing 15, 16 in the manner shown in FIG. 2. The casing part 16 carries flanges 17 which are folded over the casing part 15 after the cell is assembled.

The depolarizer electrode according to the invention lends itself to simple and inexpensive mass-production. An unexpected advantage lies in the fact that thermal cells made with the new depolarizer electrode show greatly improved mechanical and electrical characteristics. Analysis of spent thermal cells has shown that the unpasted portion of the screen has a beneficial effect on the operation of the cell. It provides a safety space for gases developed during the activation of the cell by heating and it also makes it possible that the melted electrolyte penetrates thru the uncovered portion of the screen into the narrow space between the nickel casing and the adjacent surface of the pasted electrode.

It will be obvious to those skilled in the art that various metal screens and various methods of welding the screens to the metal casings may be used without departing from the inventive idea defined in the appended claims.

What is claimed is:

1. A method of producing depolarizer electrodes for thermal batteries composed of thin, flat type cells each cell comprising a negative electrode, a solid nonconductive electrolyte which remains solid at storage temperatures, and depolarizer electrodes welded to a metal casing inclosing all cell elements, said method comprising covering at least one edge of a metal screen with a masking tape, pasting into the uncovered portions of the screen a depolarizer slurry, drying the pasted screen, removing the masking tape and welding the unpasted portion of the electrode to the inner surface of said metal casing.

2. A method of producing depolarizer electrodes for thermal batteries according to claim 1 in which said metal screen consists of a nickel coated copper screen.

3. A method of producing depolarizer electrodes for thermal batteries according to claim 1 in which opposite edges of said metal screen are covered with masking tape before the pasting operation.

References Cited

UNITED STATES PATENTS

| | | | |
|---|---|---|---|
| 2,616,939 | 11/1952 | Fischbach | 136—120 X |
| 2,658,935 | 11/1953 | Chubb | 136—120 X |
| 2,678,343 | 5/1954 | Daniel | 136—120 X |

ALLEN B. CURTIS, *Primary Examiner.*

WINSTON A. DOUGLAS, ROGER L. CAMPBELL, *Examiners.*

A. SKAPERS, C. D. QUARFORTH, W. A. KEMMEL, *Assistant Examiners.*